(12) United States Patent
Agapiou et al.

(10) Patent No.: US 8,192,690 B2
(45) Date of Patent: Jun. 5, 2012

(54) METHODS AND DEVICES FOR POLYMERIZATION

(75) Inventors: Agapios K. Agapiou, Humble, TX (US); David M. Glowczwski, Baytown, TX (US); Zerong Lin, Kingwood, TX (US); Gary D. Mohr, Houston, TX (US); Ted A. Powell, La Porte, TX (US); Michael E. Sieloff, Houston, TX (US); Edward F. Smith, Kingwood, TX (US); Kevin B. Stavens, Seabrook, TX (US); Keith W. Trapp, Houston, TX (US); Michael E. Muhle, Kingwood, TX (US); F. David Hussein, Cross Lanes, WV (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 13/277,794

(22) Filed: Oct. 20, 2011

(65) Prior Publication Data
US 2012/0039755 A1 Feb. 16, 2012

Related U.S. Application Data

(62) Division of application No. 12/525,202, filed as application No. PCT/US2008/001780 on Feb. 11, 2008, now Pat. No. 8,084,554.

(60) Provisional application No. 60/905,274, filed on Mar. 6, 2007.

(51) Int. Cl.
*B01J 19/00* (2006.01)
*C08F 2/00* (2006.01)
*C08F 4/24* (2006.01)
*C08F 210/00* (2006.01)

(52) U.S. Cl. ........... 422/131; 526/62; 526/348; 526/106

(58) Field of Classification Search ................. 422/131; 526/62, 106, 348
See application file for complete search history.

(56) References Cited

U.S. PATENT DOCUMENTS

| | | | |
|---|---|---|---|
| 3,449,062 | A | 6/1969 | Reh et al. |
| 3,539,293 | A | 11/1970 | Boucraut et al. |
| 4,460,330 | A | 7/1984 | Asai et al. |
| 4,532,311 | A | 7/1985 | Fulks et al. |
| 4,792,592 | A | 12/1988 | Fulks et al. |
| 4,803,251 | A | 2/1989 | Goode et al. |
| 4,876,320 | A | 10/1989 | Fulks et al. |
| 5,391,657 | A | 2/1995 | Song et al. |
| 6,335,402 | B1 | 1/2002 | Mihan et al. |
| 2002/0026018 | A1 | 2/2002 | Agapiou et al. |

FOREIGN PATENT DOCUMENTS

| | | | |
|---|---|---|---|
| WO | 9749771 | A1 | 12/1997 |
| WO | 2004029098 | A1 | 4/2004 |
| WO | WO 2007/031573 | A1 * | 3/2007 |

* cited by examiner

*Primary Examiner* — William Cheung

(57) ABSTRACT

A method of treating a gas phase fluidized bed reactor and a method of polymerizing olefins in a gas phase fluidized bed reactor in the presence of a catalyst prone to cause sheeting by introducing a chromium-containing compound into the reactor and forming a high molecular weight polymer coating on the walls of the reactor. Furthermore, a device for and method of introducing the chromium-containing compound into the fluidized bed reactor at a plurality of locations in proximity to a lower section of a bed section wall of the fluidized bed reactor, and forming a high molecular weight polymer coating on the bed section wall.

7 Claims, 3 Drawing Sheets

METHODS AND DEVICES FOR POLYMERIZATION

CROSS-REFERENCE TO RELATED APPLICATIONS

This application is divisional of U.S. application Ser. No. 12/525,202, filed on Nov. 16, 2009, now U.S. Pat. No. 8,084,554, which is a National Stage application under 36 U.S.C. §371 of International Application No. PCT/US2008/001780, filed Feb. 11, 2008, that claims the benefit of Ser. No. 60/905,274, filed Mar. 6, 2007, the disclosures of which are incorporated by reference in their entireties.

FIELD OF THE INVENTION

This disclosure generally relates to a process for polymerizing olefin(s). The invention particularly relates to methods of polymerizing olefins in the presence of a catalyst prone to sheeting, and methods of and devices for treating a gas phase polymerization reactor used for polymerizing olefins.

BACKGROUND

Gas phase polymerization of monomers, for example, olefin monomers, may be prone to forming "sheets" on the walls of the reactor vessel, particularly on certain catalyst types. Sheeting refers to the adherence of fused catalyst and resin particles to the walls or the dome of a reactor. The sheets vary widely in size. Sheets may be ¼ to ½ inch thick and may be from a few inches to several feet long. They may have a width of 3 inches to more than 18 inches. The sheets may have a core composed of fused polymer, which is oriented in the long direction of the sheets, and their surfaces are covered with granular resin that has fused to the core. The edges of the sheets often have a hairy appearance from strands of fused polymer. Sheeting rapidly plugs product discharge systems and/or disrupts fluidization, leading to the need for costly and time-consuming shutdowns.

Gas phase processes have been found to be particularly prone to sheeting when producing polymers using Ziegler-Natta catalysts, particularly Type III and Type IV Ziegler-Natta catalysts, certain bimodal catalyst systems, and catalyst systems containing metallocene catalyst compounds. While metallocene catalysts yield polymers with unique characteristics, they also present new challenges relative to traditional polymerization systems, in particular, the control of reactor sheeting.

A correlation exists between reactor sheeting and the presence of excess static charges, either positive or negative, in the reactor during polymerization (see, for example, U.S. Pat. Nos. 4,803,251 and 5,391,657). This is evidenced by sudden changes in static levels followed closely by deviation in temperature at the reactor wall. When the static charge levels on the catalyst and resin particles exceed critical levels, electrostatic forces drive the particles to the grounded metal walls of the reactor. The residency of these particles on the reactor wall facilitates melting due to elevated temperatures and particle fusion. Following this, disruption in fluidization patterns is generally evident, such as, for example, catalyst feed interruption, plugging of the product discharge system, and the occurrence of fused agglomerates (sheets) in the product.

It has been found that the presence of polymer coating on the interior surface of the reactor walls, i.e., the surfaces in contact with the polymerization bed, is desirable for reducing the tendency of a gas phase reactor to form sheets. Without being bound by theory, it is believed that the presence of certain reactor wall coatings, for example, a high molecular weight polymer coating, inhibits formation of localized areas of electrostatic charge accumulation on the reactor wall surface. Without being bound by theory, it is further believed that localized areas of electrostatic charge accumulation contribute to the formation of sheets.

Certain chromium compounds aid in the formation of a high molecular weight coating that may be effective in reducing charge buildup on reactor walls and impeding sheet formation. For example, U.S. Pat. Nos. 4,532,311, 4,792,592, and 4,876,320 disclose methods of reducing sheeting in a fluidized bed reactor by introducing a chromium-containing compound into the reactor prior to polymerization and reacting the chromium to form the high molecular weight coating on the walls of the reactor. A particular class of chromium compounds useful in this method is chromocenes, such as bis-cyclopentadienyl chromium.

Two commonly used techniques for treatment or retreatment of reaction systems involve preparation of the wall (for existing reaction systems this required removal of the bad or contaminated polymer coating) and the in situ creation of a new polymer layer. The first of these treatment techniques is a chromocene treatment method (see, for example, U.S. Pat. Nos. 4,532,311, 4,792,592, and 4,876,320). With this method, the walls of the reactor vessel are cleaned, for example, by sandblasting, then the reactor is treated to form a new high molecular weight coating. For existing reactors, the cleaning removes any polymer, including contaminated polymer, from the reactor walls. The reactor is then sealed and purged with nitrogen. A solution of catalyst, for example, chromocene, is injected into the reactor and circulated for an extended period of time. The catalyst deposits on the reactor wall. The deposited catalyst is oxidized and then the reactor is opened for cleaning. After cleaning, ethylene is added to the reactor, and the catalyst reacts with ethylene to form a new polymer coating. After the new polymer coating is formed, the initial product must be monitored closely for the possibility of various quality issues that may arise during initial production due to the presence of sand or concentrated liquid catalyst particles that may remain in the reaction system after treatment. These methods typically use a mixture of the chromium-containing compound in an inert solvent, such as toluene, to contact the reactor walls with the chromium-containing compound. It is generally believed that, the concentration of the chromium-containing compound in the inert solvent is not critical to the process, but is selected so as to assure that the chromium-containing compound is completely dissolved in the solvent. A solution containing about 6 to 8 percent by weight of chromocene in toluene is typically used.

A second treatment method, a retreatment technique, involves hydroblasting the walls of the reactor. In this process, the contaminated polymeric layer is removed with a high-pressure water jet (e.g., hydroblast). The reactor is dried, purged with nitrogen and restarted. The latter restart step employs producing a polymer product at relatively high concentrations of hydrogen so as to produce a high melt index material (i.e., $MI \geq 10$) that is less prone to sheeting and readily deposits on the reactor wall to form a new polymer coating. The prior art methods have proven effective to some degree and with some catalyst systems.

The polymer coating formed on the walls of the reactor in contact with the fluidized bed during normal operation (referred to herein as the bed section wall) is typically about 1 to about 10 mils (0.025 to 0.25 millimeters (mm)) in thickness. As used herein, a mil refers to 0.001 inches. Furthermore, the polymer coating is not of uniform thickness throughout the bed section wall. Without being bound by theory, it is believed that the current methods do not provide an even polymer coating on the bed section wall because the chromium is not deposited evenly on the bed section wall. Still further, it is also believed that a significant amount of the deposited chromium may be deactivated before it is reacted with a monomer to form the polymer coating. It is theorized that the relatively thin and uneven nature of the polymer coatings of the current technology may limit the effectiveness of the polymer coating at preventing sheeting, and may shorten the effective life of the polymer coating.

Furthermore, with the current methods, it may also be necessary to operate the polymerization system on catalyst systems that are less prone to sheeting, for example, non-metallocene catalyst systems. This may result in product supply issues.

Still further, it has been found that when using prior art methods to treat a reactor, the reactor must be periodically re-treated, as the polymer coating degrades over time. The time between treatments varies depending on the effectiveness of the last treatment, products produced, catalyst type, and a number of other factors.

Referring to Prior Art FIG. 1, depositing chromium on the interior surfaces of the polymerization reactor is typically done by the injection of a chromocene containing solution through one of the catalyst injection points 2 of the reactor 4. The solution may be injected through a single straight tube, or may be injected through a single tube with a spray nozzle located at the end of the tube. An inert, such as nitrogen, is circulated through the reactor 4 by the cycle compressor 6 while the solution is slowly injected over a period of time, at least one to three hours, and may be as long as eight hours. The reaction system then circulates the mixture for a period of about twenty hours. In this method, it has been found that the level of chromium deposited on the bed section wall is significantly lower than the level of chromium deposits in the bottom head and on the bottom of the plate. Thus, the method preferentially deposits the chromium on the distributor plate 10 and in various parts of the reactor system other than the bed section wall, such as the cycle compressor 6, and the cycle cooler 12. The chromium deposited on the distributor plate 10 and other parts of the reaction system by the prior art method typically must be cleaned off before reacting the chromium to form the polymer coating.

Because the excess chromium is cleaned from the various parts of the reaction system before forming the coating, the reaction system is opened to the air before the coating is reacted with a monomer. Before opening and cleaning the reactor, the chromium is oxidized by exposure to a relatively low level of oxygen (e.g., about 100 ppmv). Without being bound by theory, it is believed that further oxidation of the chromium occurs when the reaction system is opened to air. Still further, it is theorized that the exposure to air results in excess oxidation of the chromium and a lower chromium activity when forming the polymer coating.

Other background references include U.S. Pat. Nos. 3,449,062, 3,539,293, 4,460,330, 6,335,402; U.S. Patent Application Publication No. 2002/026018; and WO 1997/49771, WO 2004/029098.

It is thus desirable to develop an improvement to a method for polymerization of alpha-olefins in the presence of a catalyst prone to sheeting. It is also desirable to provide a method of treating a gas phase fluidized bed polymerization reactor to preferentially deposit a chromium containing compound on the bed section walls of the reactor, and form a high molecular weight coating on the bed section walls of the reactor that is thicker, and more uniform. It is also desirable to provide an apparatus to effectively deliver a treatment to the bed section walls of a gas phase fluidized bed polymerization reactor.

SUMMARY

In one class of embodiments, the current invention provides an improvement in a method for the polymerization of alpha-olefins in a fluidized bed reactor in the presence of a catalyst that may cause sheeting during the polymerization, by maintaining a static electric charge in the reactor at the site of possible sheet formation below static voltage levels which would otherwise cause sheet formation by introducing a chromium-containing compound into the fluidized bed reactor in such manner as to contact the surfaces of the reactor, the chromium in the chromium-containing compound being present in a valence state from 2 to 3, the improvement comprising forming a high molecular weight polymer coating greater than about 10 mils (0.25 mm) thick on a bed section wall of the fluidized bed reactor.

In one of the embodiments, the high molecular weight polymer coating is greater than about 10 mils (0.25 mm) thick on substantially all portions of the bed section wall.

In another embodiment, the high molecular weight polymer coating is greater than about 20 mils (0.51 mm) thick on substantially all portions of the bed section wall.

In still another embodiment, the high molecular weight polymer coating has an average thickness of greater than about 10 mils (0.25 mm) on the bed section wall.

In yet another embodiment, the high molecular weight polymer coating has an average thickness of greater than about 20 mils (0.51 mm) on the bed section wall.

In one embodiment, the high molecular weight polymer coating has a charge decay of greater than about 150 volts on substantially all portions of the bed section wall.

In another embodiment, the high molecular weight polymer coating between 0.3 and 2.4 meters above a distributor plate has a charge decay of greater than about 1,000 volts.

In one embodiment, a bed section wall surface comprises greater than about 0.3% chromium on substantially all portions of the bed section wall.

Another class of embodiments provides an improvement in a method for the polymerization of an alpha-olefins in a fluidized bed reactor in the presence of a catalyst that may cause sheeting during the polymerization, by maintaining a static electric charge in the reactor at the site of possible sheet formation below static voltage levels which would otherwise cause sheet formation by introducing a chromium-containing compound into the fluidized bed reactor in such manner as to contact the surfaces of the reactor, the chromium in the chromium-containing compound being present in a valence state from 2 to 3, the improvement comprising introducing the chromium-containing compound into the fluidized bed reactor through a plurality of injection devices located inside the fluidized bed reactor and in proximity to a lower section of a bed section wall of the fluidized bed reactor.

In one embodiment, the chromium-containing compound is introduced into the fluidized bed reactor over a period of time of less than about 1 hour.

In another embodiment, a non-reacting gas is circulated through the fluidized bed reactor for less than about 5 hours after introducing the chromium-containing compound.

In yet another embodiment, the non-reacting gas is circulated for less than about 2 hours after introducing the chromium-containing compound.

In yet still another embodiment, the chromium is preferentially deposited on the bed section wall of the fluidized bed reactor.

One embodiment further comprises the step of oxidizing the deposited chromium by adding oxygen and circulating for less than 2 hours.

In another embodiment, the oxygen is added in a substantially stoichiometric amount with the amount of chromium introduced.

In an embodiment wherein the chromium is deposited on the bed section wall of the fluidized bed reactor, the method further comprises the step of oxidizing the deposited chromium by adding oxygen in a substantially stoichiometric amount with the chromium.

Another embodiment further comprises the step of reacting the chromium with ethylene to form a high molecular weight polymer coating, wherein the reacting occurs after an oxidizing step and before opening the fluidized bed reactor, and wherein no fluidized bed is present during the reacting step.

Yet another embodiment further comprises the step of producing a metallocene based polymer product after forming the high molecular weight polymer coating absent the production of a non-metallocene based polymer product before producing the metallocene based polymer product.

Another class of embodiments provides a method for treating a fluidized bed reactor to reduce sheeting during the polymerization of polyolefin's in the presence of a catalyst that may cause sheeting, the method comprising the steps of: (a) introducing a chromium-containing compound into a fluidized bed reactor at a plurality of locations in proximity to a lower section of a bed section wall of the fluidized bed reactor, wherein the chromium-containing compound is contacted with the bed section wall; and (b) forming a high molecular weight polymer coating on the bed section wall.

In another embodiment, the chromium is preferentially deposited on the bed section wall of the fluidized bed reactor.

In yet another embodiment, the method further comprises the step of oxidizing the chromium after the chromium compound is introduced and before forming the high molecular weight polymer coating, and wherein the high molecular weight polymer coating is formed by reacting the chromium with ethylene.

In still another embodiment, the forming the high molecular weight coating step occurs before opening the fluidized bed reactor, and there is no fluidized bed present during the forming step.

In yet another embodiment, the chromium-containing compound is introduced into the fluidized bed reactor over a first period of time of less than about 1 hour, and the method further comprises the step of circulating a non-reacting gas through the fluidized bed reactor for a second period of time after introducing the chromium-containing compound, wherein the second period of time is of less than about 5 hours.

In yet still another embodiment, the second period of time is less than about 2 hours.

In one embodiment, the oxidizing step is completed in less than about 2 hours.

In still another embodiment, the concentration of oxygen during the oxidation is less than about 200 ppmv.

In yet still another embodiment, the concentration of oxygen during the oxidation is less than about 100 ppmv.

In one embodiment, the method further comprises the step of deactivating a cocatalyst by feeding $CO_2$ to the fluidized bed reactor.

In another embodiment, the method further comprises the step of polishing the high molecular weight polymer coating on the bed section wall after the forming step.

In one embodiment, a metallocene based polymer product is produced after forming the high molecular weight polymer coating absent the production of a non-metallocene based polymer product before producing the metallocene based polymer product.

Another class of embodiments provides a device for treating a fluidized bed reactor comprising a plurality of injection devices located inside a fluidized bed reactor, wherein the injection devices are placed in proximity to a lower section of a bed section wall of the fluidized bed reactor, and the injection devices are oriented to contact a treatment fluid with the bed section wall.

In one embodiment, the plurality of injection devices are oriented at an angle of about 40 to about 50 degrees up from a horizontal plane, and the plurality of injection devices are oriented in the horizontal plane at an angle of about 40 to about 50 degrees inward from the tangent to the bed section wall.

In another embodiment, a chord length between each of the plurality of injection devices is about 1.5 to about 1.9 meters, the plurality of injection devices are placed about 0.15 to about 1.0 meters above a distributor plate, the plurality of injection devices are placed about 0.10 to about 0.50 meters from the bed section wall, and the plurality of injection devices have a spray angle of about 100 to about 120 degrees.

In still another embodiment, the plurality of injection devices are placed about 0.40 to about 0.60 meters above the distributor plate.

In yet still another embodiment, the plurality of injection devices are placed about 0.10 to about 0.20 meters from the bed section wall.

DETAILED DESCRIPTION OF THE INVENTION

Figure 1:
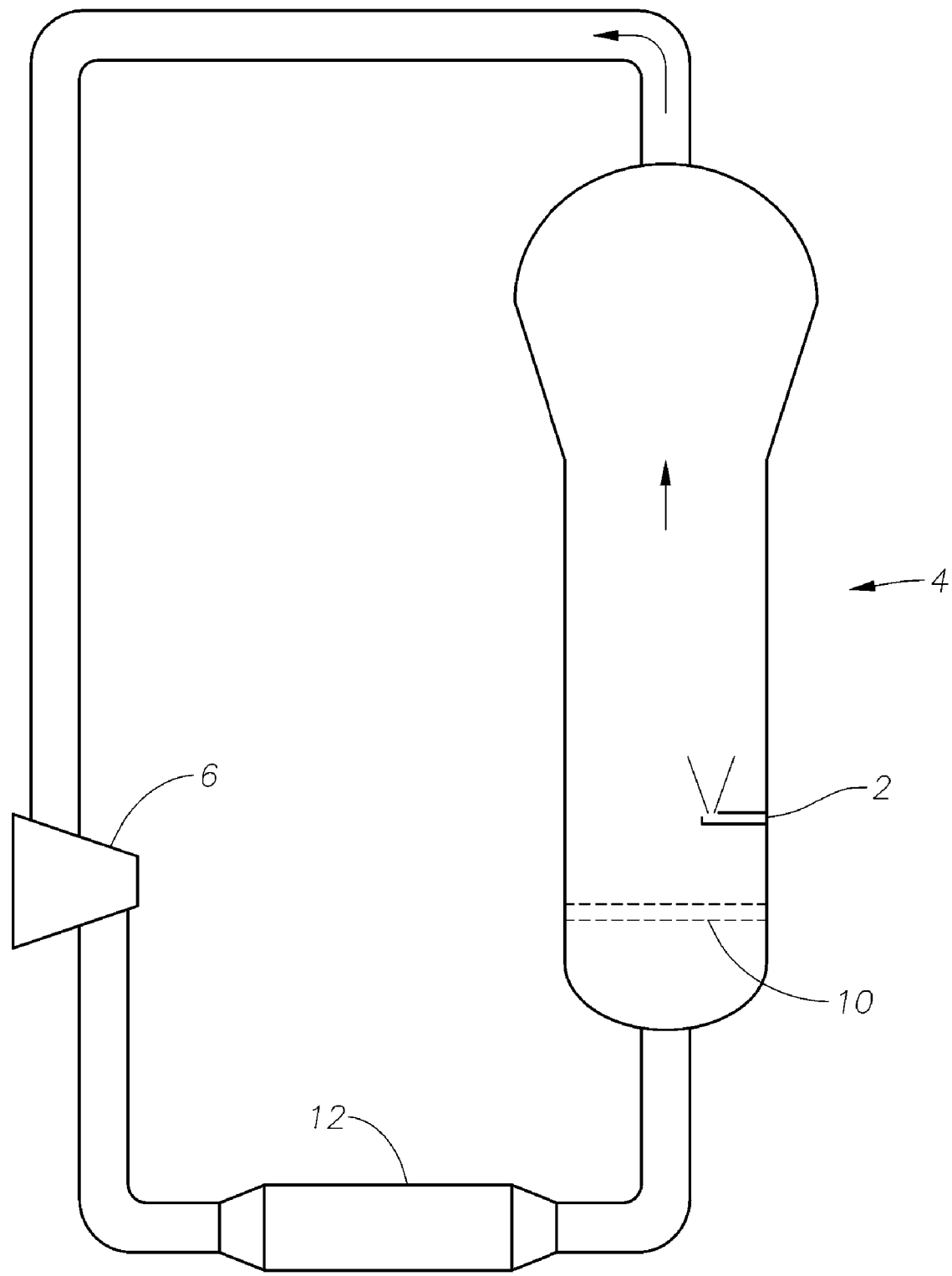
FIG. 1 is schematic of a prior art gas phase reactor and its ancillary equipment showing a treatment injection device.

Before the present compounds, components, compositions, and/or methods are disclosed and described, it is to be understood that unless otherwise indicated this invention is not limited to specific compounds, components, compositions, reactants, reaction conditions, ligands, metallocene structures, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a," "an" and "the" include plural referents unless otherwise specified. Thus, for example, reference to "a leaving group" as in a moiety "substituted with a leaving group" includes more than one leaving group, such that the moiety may be substituted with two or more such groups. Similarly, reference to "a halogen atom" as in a moiety "substituted with a halogen atom" includes more than one halogen atom, such that the moiety may be substituted with two or more halogen atoms, reference to "a substituent" includes one or more substituents, reference to "a ligand" includes one or more ligands, and the like.

One class of embodiments, provides an improvement in a method for the polymerization of an alpha-olefin in a fluidized bed reactor in the presence of a catalyst that may cause sheeting during the polymerization, by maintaining the static electric charge in the reactor at the site of possible sheet formation below static voltage levels which would otherwise cause sheet formation by introducing a chromium-containing compound into the fluidized bed reactor in such manner as to contact the surfaces of the reactor, the chromium in the chromium-containing compound being present in a valence state from 2 to 3. Specifically, the method comprises forming a high molecular weight polymer coating greater than about 10 mils (0.25 mm) thick on the bed section wall of the fluidized bed reactor.

As used herein, "high molecular weight polymer coating" refers to a coating comprising at least 25 wt % of an insoluble polymer fraction and a soluble polymer fraction having at least 10 wt % polymers (based upon the total weight of the high molecular weight polymer coating) exhibiting a molecular weight as measured by high temperature GPC (using a trichloro benzene solvent at 150° C., sample prepped at 160° C. for 2 hr, microwaved at 175° C. for 2 hr) of at least one million Daltons or greater.

Methods for the polymerization of an alpha-olefins in a fluidized bed reactor in the presence of a catalyst that may cause sheeting during the polymerization, by maintaining the static electric charge in the reactor at the site of possible sheet formation below static voltage levels which would otherwise cause sheet formation by introducing a chromium-containing compound into the fluidized bed reactor in such manner as to contact the surfaces of the reactor are discussed in U.S. Pat. Nos. 4,532,311, 4,792,592, and 4,876,320. These methods provide for treating the walls of the reactor vessel prior to the commencement of routine polymerization with a chromium-containing compound wherein the chromium is present in the reactor at a valence from 2 to 3. According to this method, sheeting during routine polymerization is substantially reduced and in some cases entirely eliminated.

In general, the treatment, for example, a chromium-containing compound, is introduced into the reactor prior to routine polymerization and may be introduced in any manner such that the surfaces, particularly the walls of the reactor, are contacted with the treatment. In any of the embodiments described herein, the polymerization reaction system may be purged with a non-reactive gas, such as nitrogen, and the non-reactive gas may be circulated through the reactor during treatment. While the non-reactive gas is being circulated a treatment, for example, a chromium-containing compound, is introduced into the reactor. The treatment contacts the surfaces in the reaction system during the circulation. The treatment is carried out for sufficient time to achieve the desired result, typically several hours to several days. After treatment, the reactor is cleaned. After cleaning, the reactor is ready to begin polymerization.

A resin bed may be employed to help deliver a chromium-containing compound to the walls of the reactor. This bed (together with another scrub bed after the post-treatment cleaning procedure) must be disposed of as scrap material. However, in any of the embodiments described herein, there may be no resin bed present when feeding the treatment fluid to the fluidized bed reactor, or when forming the high molecular weight polymer coating. In a class of embodiments, this method provides an advantage over the prior art because there is no need to dispose at least one of the beds of contaminated resin (for example, a bed contaminated with chromium).

In any of the embodiments described herein, the treatment may comprise a chromium-containing compound. Furthermore, in any of the embodiments described herein, the chromium may be present in the reactor at a valence of plus 2 or 3 (the chromium may be fed in a 2 to 3 valence or converted to a 2 to 3 valence after being introduced). Compounds may include, but are not limited to, bis(cyclopentadienyl) chromium (II) compounds having the following formula:

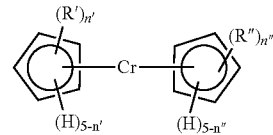

wherein R' and R" may be the same or different $C_1$ to $C_{20}$ inclusive, hydrocarbon radicals, and n' and n" may be the same or different integers of 0 to 5, inclusive. The R' and R" hydrocarbon radicals may be saturated or unsaturated, and may include aliphatic, alicyclic and aromatic radicals such as methyl, ethyl, propyl, butyl, pentyl, cyclopentyl, cyclohexyl, allyl, phenyl and naphthyl radicals. Other specific compounds that may be suitable include chromic acetyl acetonate, chromic nitrate, chromous or chromic acetate, chromous or chromic chloride, chromous or chromic bromide, chromous or chromic fluoride, chromous or chromic sulfate, and polymerization catalysts produced from chromium compounds where the chrome may be present in the plus 2 or 3 valence state.

Any of the embodiments described herein, may inject a chromium-containing compound containing about 1 to about 8 weight percent (wt %) chromium dissolved in an inert solvent, based upon the total weight of the treatment. In other embodiments, the mixture may contain less than about 6 wt %, or less than about 5 wt % chromium-containing compound in an inert solvent, based upon the total weight of the treatment. One inert solvent that may be used is toluene. Without being bound by theory, it is believed that the lower concentration mixture provides better delivery of the chromium-containing compounds to the bed section wall because of the larger volume of solution available to spray onto the wall, and because the lower concentration maintains solubility at colder temperatures (cylinders of solution are typically exposed to ambient temperatures).

The amount of chromium compound utilized in the process should be sufficient to effect the desired result, and the amount can be determined without undue experimentation. In any of the embodiments described herein, the amount of chromium compound introduced into the fluidized bed reactor may be greater than about 0.0031 lbs of chromium-containing compound per square foot (0.015 kgs/m$^2$) of surface area to be treated. In other embodiments, greater than about 0.0037 lbs/ft$^2$ (0.018 kgs/m$^2$) of chromium-containing compound may be introduced. In yet other embodiments, greater than about 0.0045 lbs of chromium-containing compound per square foot (0.022 kgs/m$^2$) of surface area to be treated may be introduced into the fluidized bed reactor. In still other embodiments, about 0.0037 to about 0.0045 lbs/ft2 (0.018 to 0.022 kgs/m$^2$) of chromium-containing compound may be introduced. As used herein, the surface area to be treated refers to the surface area of the cylindrical section above plate, expanded section, and top head of the fluidized bed reactor. (See for example, FIG. 1).

The high molecular weight polymer coating formed is typically a clear coating of polymer that is formed when the chromium deposited on the interior surfaces of the reactor is reacted with a monomer, for example, ethylene. The reaction may take place in the presence of the monomer and a poison scavenger/cocatalyst, for example an aluminum alkyl such a tri-ethylaluminum (TEAl).

Surprisingly, the high molecular weight coating of the current invention is thicker and more evenly distributed than prior art methods. In any of the embodiments described herein, the high molecular weight polymer coating may be greater than about 10 mils (0.010 inches or 0.25 mm) thick on the bed section wall of the fluidized bed reactor, and may be greater than about 10 mils (0.25 mm) thick on substantially all portions of the bed section wall. In other embodiments, the high molecular weight polymer coating may be greater than about 20 mils (0.020 inches or 0.51 mm) thick on the bed section wall of the fluidized bed reactor, and may be greater than about 20 mils (0.51 mm) thick on substantially all portions of the bed section wall. As used herein, "bed section wall" refers to the portions of the fluidized bed reactor internal walls that are in contact with the fluidized bed during normal operation. In a typical fluidized bed reactor with a cylindrical straight section and an expanded section, the bed section wall is that portion of the cylindrical straight section of the fluidized bed reactor from the distributor plate to the expanded section. In any of the embodiments described herein, the bed section wall may also include portions of the internal wall of the expanded section, particularly in the lower portion of the expanded section. As used herein, "substantially all portions" of a surface refers to largely, but not necessarily wholly, the surface referenced. This means that when "substantially all portions of the bed section wall" are referenced, the characteristic (coating thickness, chromium content, or other parameter) will be found largely at most points of the bed section wall, but not necessarily at every point on the wall.

The success of forming the high molecular weight polymer coating may also be evaluated by measuring the average thickness of the coating on the bed section wall. Thus, In any of the embodiments described herein, the high molecular weight polymer coating formed on the bed section wall of the fluidized bed reactor may have an average thickness of greater than about 10 mils (0.25 mm), greater than about 20 mils (0.51 mm), greater than about 25 mils (0.64 mm), or even greater than about 30 mils (0.76 mm).

In gas phase polymerization reaction systems, frictional contact of polymer particles with the walls of the reaction vessel may contribute to sheeting by imparting an electrical charge to the polymer particles. Without being bound by theory, it is believed that a coating similar in composition to the polymer in the fluid bed may reduce, decrease, or prevent the accumulation of electrical charges in the polymer particles. Reaction vessels with a high molecular weight polymer coating exhibit a reduced tendency to accumulate an electrical charge in the polymer particles. Reducing the charge accumulation of the polymer particles reduces the potential to form sheets. Without being bound by theory, it is believed that a high molecular weight polymer coating on the reactor wall reduces the creation of charges and also allows accumulated charges to dissipate.

The success of forming the high molecular weight polymer coating may also be evaluated by measuring how the high molecular weight polymer coating resists the creation of, retains, or dissipates electrical charges. Any method of evaluating the charging, charge retention, and charge dissipation may be used to evaluate the coating. One method is to measure the charge decay performance of the high molecular weight polymer coating. Charge decay performance measures the rate that a coating dissipates a corona charge imposed on the surface of the coating and the level of residual charge present on the surface after a period of time. A corona charge deposition provides a means to simulate practical charging events under controlled and predetermined conditions of initial surface voltage and charge polarity. Corona discharges occur in gaseous media when the localized electric field in the neighborhood of a body exceeds the electrical breakdown voltage of the gaseous medium. They are usually generated as a brief pulse of high voltage to a receiving surface. The charge transfer results in a high initial voltage on the receiving surface. The voltage level decays over time and is referred to as a charge decay curve. The charge decay curve generally exhibits a plateau voltage after an initial and rapid fall of surface voltage. A residual charge is the plateau voltage measured at a given period of time after the corona charge is imposed on the surface. The charge decay of a surface can be measured by any suitable commercially available device, for example, a JCI 155 Charge Decay Meter (JCI, Cheltenham, UK). Because polarity may vary, unless stated otherwise, all voltage readings referenced herein are the absolute values of the voltage.

Thus, as used herein, a "residual charge" or "charge decay" is the absolute value of voltage on the surface of a coating after a corona voltage applied to the surface has partially dissipated. It may be desirable to normalize charge decay readings to a standard coating thickness, particularly when dealing with coatings of 10 mils (0.25 mm) or less thickness. Thus, in any of the embodiments described herein, the voltage readings may be normalized to a 10 mil (0.25 mm) coating thickness. The voltage reading is typically taken a period of time, for example, 300 seconds, after the corona voltage is applied that is a sufficient time for the voltage to stabilize to a degree (reach a noticeable plateau). The residual charge reading may be taken with any suitable instrument, for example a JCI Charge Decay Meter. The corona discharge voltage may vary depending on the test instrument. In any of the embodiments described herein, the corona voltage applied may be between about −10,000 and about +10,000 volts. In any of the embodiments described herein, the residual charge reading may be taken 300 seconds after the corona voltage is applied. The voltage readings may be normalized to a 10 mils (0.25 mm) thickness using the following equation:

$$\text{Normalized Charge} = \text{Actual Charge} \times (10/T)^n$$

where T=actual thickness of the coating in mils, and n is typically between 0.5 and 1.5

In any of the embodiments described herein, the high molecular weight polymer coating on the bed section wall of the fluidized bed reactor may have a charge decay of greater than about 150 volts, and may be greater than about 400 volts. In other embodiments, the high molecular weight polymer coating may have a charge decay of greater than about 150 volts on substantially all portions of the bed section wall, and may be greater than about 400 volts on substantially all portions of the bed section wall. In still other embodiments, the high molecular weight polymer coating between 0.3 and 2.4 meters above the distributor plate may have a charge decay of greater than about 1,000 volts, and may be greater than about 1,200 volts.

Another method of evaluating the distribution of chromium on the reactor walls is to measure the amount of chromium present on different surfaces in the fluidized bed reactor. To measure the chromium present, a sample of the surface of interest, such as a coupon placed in the reactor, a blind plugging a nozzle, a manway, or other sample section may be removed and analyzed after the chromium is deposited. Alternately, a portable X-ray fluorescence meter may be used to measure the chromium levels on the surfaces inside the fluidized bed reactor. For example, a Niton XLt 800 Series Alloy Analyzer, which analyzes the content of a metal by analyzing the surface of the metal, may be placed on the wall and measurements of alloy content taken. The analyzer may be set in the "All Alloys Chemistry Testing Mode." The chromium readings discussed herein include chromium detected in both the reactor wall metal, for example, A516 Grade 70 carbon steel alloy, and in the high molecular weight polymer coating on the reactor wall. The resultant reading is a reading expressed as a weight percent of the alloy in the metal. Therefore, as used herein, a reading of 2.5% alloy, for example, chromium, means that the surface of the metal wall contains an amount of alloy equivalent to a metal made with 2.5% by weight of the alloy in the metal. In any of the embodiments described herein, the surface of the bed section wall may have a reading of alloy content of greater than about 0.3% chromium on the surface of substantially all portions of the bed section walls. In other embodiments, the surface of the bed section wall gives a reading of alloy content of greater than about 0.3 to about 2.5% chromium.

One class of embodiments provides an improvement in a method for the polymerization of an alpha-olefins in a fluidized bed reactor in the presence of a catalyst prone to cause sheeting during the polymerization, by maintaining the static electric charge in the reactor at the site of possible sheet formation below static voltage levels which would otherwise cause sheet formation by introducing a chromium-containing compound into the fluidized bed reactor in such manner as to contact the surfaces of the reactor, the chromium in the chromium-containing compound being present in a valence state from 2 to 3. The improvement to this method includes introducing the chromium-containing compound into the fluidized bed reactor through a plurality of injection devices located inside the fluidized bed reactor and in proximity to a lower section of a bed section wall of the fluidized bed reactor.

Another class of embodiments provides a method for treating a fluidized bed reactor to reduce sheeting during the polymerization of one or more polyolefin in the presence of a catalyst prone to cause the sheeting, the method comprising the steps of: introducing a chromium-containing compound into a fluidized bed reactor at a plurality of locations in proximity to a lower section of a bed section wall of the fluidized bed reactor, wherein the chromium-containing compound is contacted with the bed section wall; and forming a high molecular weight polymer coating on the bed section wall. In any of the embodiments described herein, the chromium may be present in the chromium-containing compound at a valence state from 2 to 3.

Injection Facilities

Figure 2:
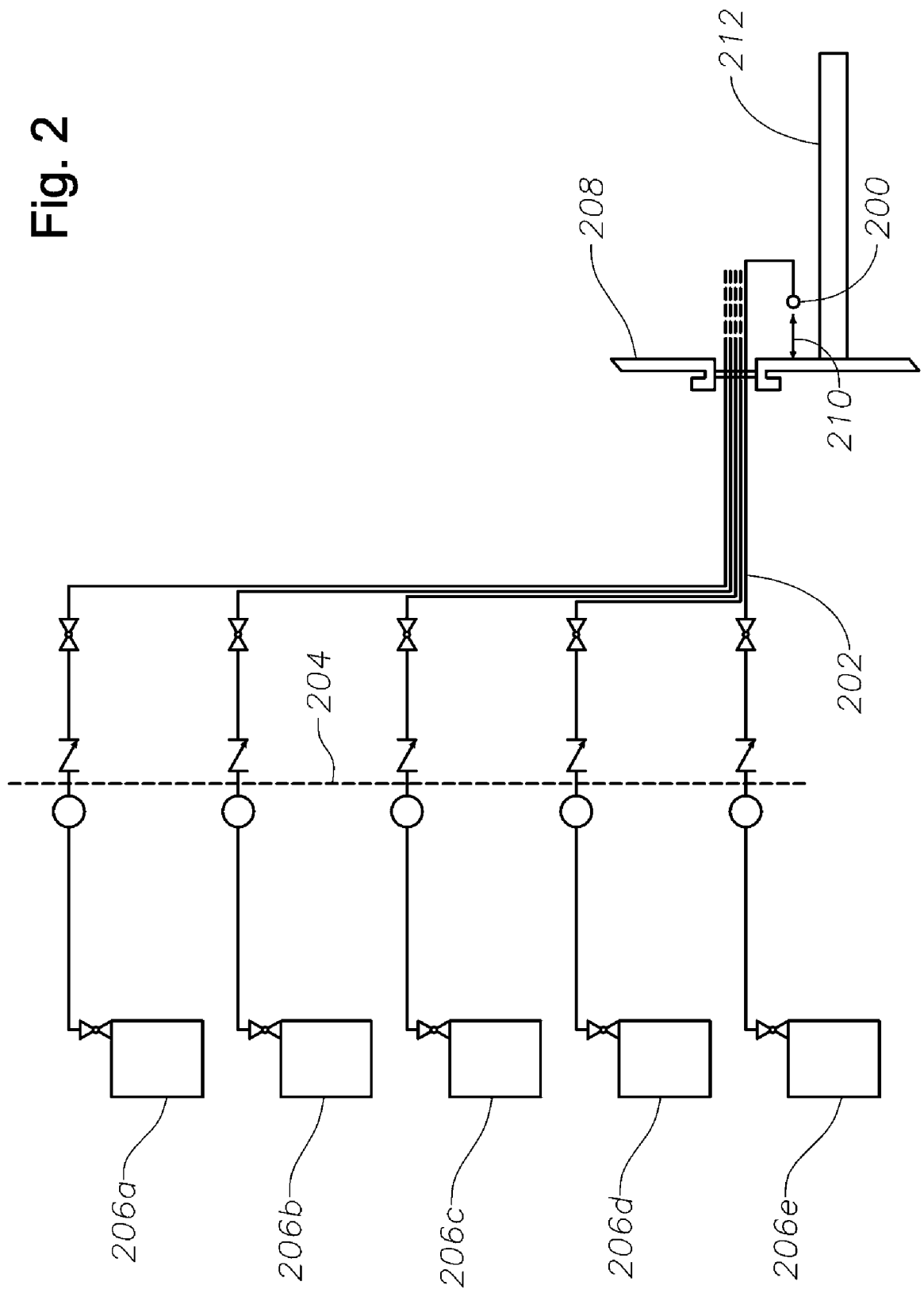
FIG. 2 is schematic of a system for introducing a treatment fluid into a fluidized bed reactor.

The injection facilities are described herein with reference to injecting a chromium-containing compound, however, any treatment may be injected using the described injection facilities. To maximize the deposition of the chromium-containing compound on the wall on the first pass up the reactor, the injection facilities provide for the introduction of the chromium-containing compound at a plurality of locations. In any of the embodiments described herein, the chromium-containing compound may be injected through a plurality of injection devices inside the fluidized bed reactor. In order to achieve good first pass contact of chromium-containing solution along the bed section walls, the chromium-containing compound may be introduced at a plurality of locations in such a manner as to create a swirling, chromium-containing cloud that moves up the reactor wall. In any of the embodiments described herein, injection devices, for example, spray nozzles, may be spaced equidistant around the reactor circumference. Referring to FIG. 2, injection devices 200 may be attached to tubing 202 that travels through bulkhead fittings 204 to individual cylinders of chromium-containing mixture 206a-e. The injection system may be constructed inside the reactor after the reactor is cleaned, for example, by sandblasting, in preparation for the treatment.

Still referring to FIG. 2, the chromium-containing compound may be introduced at a plurality of locations in proximity to a lower section of a bed section wall 208 of the fluidized bed reactor. For the purposes of this specification, the locations are considered in proximity to the bed section wall 208 if they are close enough such that the particular injection device selected and flow rate used effectively deliver the chromium-containing compound directly to the bed section walls by droplets actually contacting the bed section walls. In any of the embodiments described herein, the chromium-containing compound may be introduced, for example, by spray nozzle, at a location that is located at a distance "A" 210 from the wall, wherein "A" 210 may be about 0.10 to about 0.50 meters. In other embodiments, "A" 210 may be about 0.10 to about 0.2 meters, and may be about 0.12 meters.

As used herein, the lower section of the bed section wall 208 refers to the first 2.5 meters of the fluidized bed reactor wherein the fluidized bed contacts the walls of the reactor. In a gas phase reactor containing a distributor plate 212, this is the 2.5 meters above the distributor plate 212. In any of the embodiments described herein, the chromium-containing compound may be introduced about 0.15 to about 2.0 meters above the distributor plate, about 0.15 to about 1.0 meters above the distributor plate, about 0.4 to 0.6 meters above the distributor plate, or about 0.5 meters above the distributor plate.

Figure 3:
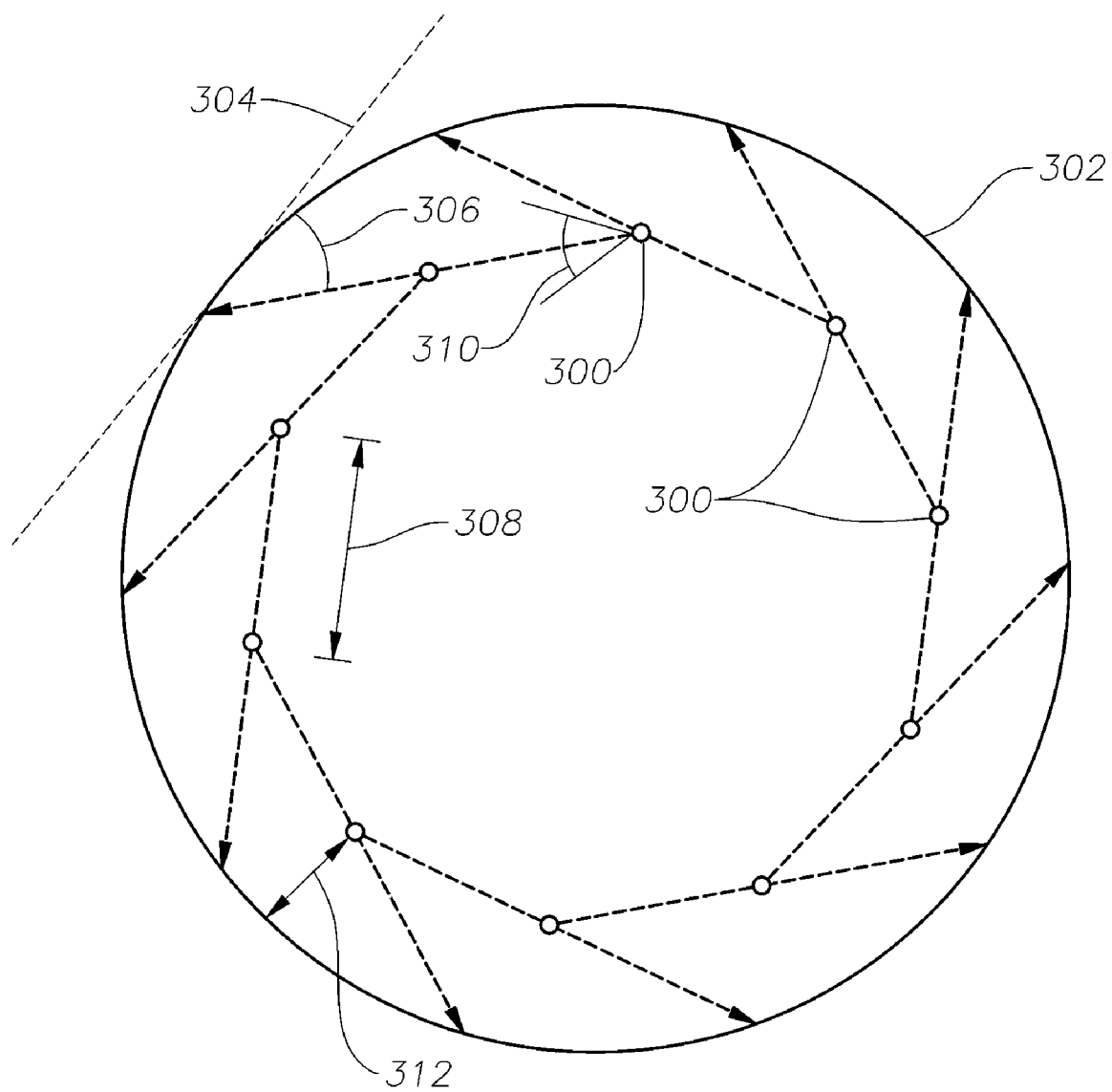
FIG. 3 is a top view showing the orientation of a plurality of injection devices located inside a fluidized bed reactor.

Referring to FIG. 3, in any one of the embodiments, a plurality of injection devices 300 may be used to introduce the chromium-containing compound, and the injection devices 300 may point in a tangential direction to the reactor wall 302 angled in from wall tangent 304 at an angle θ 306, and angled 40-50° up from horizontal to facilitate a swirling, chromium-containing cloud moving up the reactor wall. In any of the embodiments described herein, the angle θ 306 may be between about 40 to about 50°. In other embodiments, the injection devices point in a tangential direction to the reactor wall 302 angled 45-50° in from wall tangent 304, and angled about 45° up from horizontal.

Any injection device that facilitates dispersion of the chromium-containing compound/inert solvent mixture is suitable for use with the current invention. Tests to simulate reactor conditions during injection may be conducted to help facilitate the selection of injection devices. In any of the embodiments described herein, the injection devices may be spray nozzles, for example, 110° V-jet Nozzles (model H1/4VV11006 supplied by Spraying Systems Company). A 2.75 BAR nozzle differential pressure (DP) may be used to achieve a desired 2 kg/min flow rate through the 110° V-jet Nozzles.

Referring again to FIG. 3, spacing of the plurality of locations for introducing the chromium-containing compound depends on the diameter of the fluidized bed reactor being treated, the placement of the injection devices, and the spray angle of the injection devices. The injection devices may be placed to assure the lower portion of the bed section walls 302 are directly impacted with spray from the injection devices substantially all the way around the circumference of the reactor. Furthermore, the injection devices may be placed so as to minimize any overlap of spray patterns. In any of the embodiments described herein, the injection devices may be spray devices, for example, spray nozzles having a spray angle 310 of about 100 to 120 degrees, and may be placed such that a chord length 308 between each of the injection devices is about 1.5 to about 1.9 meters.

In any of the embodiments described herein, a plurality of injection devices may be provided wherein the injection devices: have a spray angle 310 of about 100 to 120 degrees; are located about 0.10 to 0.20 meters (dimension "A" 312) from the bed section wall 302; are placed such that a chord length 308 between each of the plurality of injection devices is about 1.5 to about 1.9 meters; are angled 40-50° (angle θ 306) in from wall tangent 304; and are angled 40-50° up from horizontal. In other embodiments, the injection devices may be located about 0.4 to 0.6 meters above the distributor plate.

Prior to introducing a chromium-containing compound into the reactor, the system may be prepared for treatment. Preparations may include: removing fixed tee-pees (resin back-flow preventors above the holes in the distributor plate); cleaning, for example, by sand blasting, the expanded section, dome, reactor walls, distributor plate, and bottom head; cleaning, for example, by hydroblasting, the cycle gas piping to remove polymer crust; installing injection equipment; and any other requirements necessary to protect specific components such as expansion bellows, valves, and flow venturis.

In any of the embodiments described herein, the treatment fluid, for example, a chromium-containing compound, is introduced into the fluidized bed reactor by injecting the fluid over a defined period of time that is shorter than that used in the prior art. The period of time of injection depends on the injection devices selected, the placement of the injection devices, and the mixture of chromium-containing compound and inert solvent. An optimal period of time for injection may be determined. The spray characteristics of the injection devices may require a specific flow rate to each injection device to provide an optimal flow pattern. The period of time then depends on flow rate required for the injection device selected, the amount of chromium-containing compound to be injected, the number of injection devices selected, and the number of injection devices used at one time. Any of the embodiments, the chromium-containing compound and inert solvent mixture may be introduced through one injection device at a time, or may be injected through at least two injection devices at a time. In other embodiments, the chromium-containing compound may be introduced into the fluidized bed reactor over a first period of time of less than 1 hour, or may be introduced over a first period of time of about 15 to about 30 minutes.

During and after the time the chromium-containing compound is introduced into the fluidized bed reactor, a non-reacting gas is circulated through the reactor. After the chromium-containing compound is introduced, the circulation continues for a second period of time during which the chromium-containing compound is dispersed over and deposited on the bed section walls. In a class of embodiments, the current invention provides for faster deposition of the chromium-containing compound of the bed section walls, therefore the second period of time is shorter as compared to past efforts. Without being bound by theory, it is believed that because the chromium-containing compound is contacted directly with the bed section walls, a significant portion of the chromium is deposited on the bed section walls on a first pass through the reactor. Conversely, past efforts generally injected the chromium compound into the center section of the reactor and depends on the circulating gas to transport the chromium-containing compound to the bed section walls without being bound to theory. It is believed that when using the prior art method a significant amount of the chromium-containing compound must travel around the reaction system loop before it is deposited on the bed section walls, particularly the lower portion of the bed section walls. Because the chromium-containing compound must travel around the reaction system loop, the method circulates for an extended period of time, typically about 20 hours.

Thus, in any of the embodiments described herein, the non-reacting gas may circulate through the fluidized bed reactor for a second period of time after introducing the chromium-containing compound, wherein the second period of time is less than about 5 hours, less than about 2 hours, or less than about 1 hour. In any of the embodiments described herein, the circulation may be performed at about 80 to 90° C. at a cycle gas velocity ("CGV", also referred to as a superficial gas velocity or "SGV") of about 0.35 to about 0.45 meters/sec. The CGV as used herein is the volumetric flow of the cycle gas fluidization stream divided by the cross sectional area of the fluid bed section. Furthermore, in any of the embodiments described herein, no vent may be taken from the reaction system during the circulation period.

In any of the embodiments described herein, the chromium may be preferentially deposited on the bed section wall of the fluidized bed reactor rather than on surfaces in the reaction loop, such as the cycle piping, cycle compressor, cycle cooler, and bottom of the distributor plate. Without being bound by theory, it is believed this is because the chromium-containing compound is directly contacted with the bed section walls. Following the second period of time wherein the chromium-containing compound is circulated, the chromium may be "oxidized" by injecting oxygen into the reaction system before forming the high molecular weight polymer coating and while the non-reacting gas continues to circulate. During the "oxidizing step," chromium is reacted with oxygen, replacing one of the cyclopentadienes and oxidzing the chromium. Then for the polymerization, a cocatalyst, such as tri-ethylaluminum (TEAl) reduces the chromium back to the desired valence state, for example, a valence state of plus 2 to 3. It has been surprisingly discovered that by minimizing oxygen exposure, both level and duration, the activity of the chromium is maintained at higher levels and the time to purge out the inert solvent is reduced. The higher chromium activity results in forming a surprisingly thicker high molecular weight polymer coating over a shorter period of time when the catalyst is reacted with a monomer.

In any of the embodiments described herein, the oxidizing step may be completed in less than about 2 hours, or less than about 1 hour. As used herein, the oxidizing step is considered complete after the intended amount of oxygen is fed to the reactor and the intended period of exposure to the oxygen has expired. This use of the term "completed" is not intended to mean that the oxidation is chemically complete, or that all of the chromium present is oxidized.

In any of the embodiments described herein, the amount of oxygen added to the reactor may be limited by limiting the amount of oxygen added to a substantially stoichiometric amount to the amount of chromium introduced into the fluidized bed reactor. In other embodiments, the amount of oxygen may be greater than a substantially stoichiometric amount to the chromium introduced into the fluidized bed reactor. In still other embodiments, the amount of oxygen added to the reactor may be limited by limiting the concentration of oxygen in the reactor to less than about 200 parts per million by volume (ppmv), or less than about 100 ppmv. In still other embodiments, the oxygen added may be less than about 100 ppmv, and the time of the oxidizing step is less than about 1 hour. In further embodiments, the oxidizing step may be completed without venting any non-reacting gas from the reaction system to prevent releasing un-oxidized chromium from the reaction system.

In any of the embodiments described herein, 1.0 kg of air per kg of chromium injected is added. The air may be supplied from pressurized breathing air cylinders (1 bottle typically contains approximately 10 kgs of air). In other embodiments, an initial amount of air may be added to the reactor, a conventional analyzer may measure the level of oxygen in the reactor, and then additional air may be added incrementally until an analyzer reading of approximately 100 ppmv is achieved. In yet other embodiments, the oxidizing step may be conducted while circulating the non-reacting gas at a CGV of about 0.35 to about 0.45 meters/sec and a temperature of about 80 to about 90° C.

In one class of embodiments, the method provides a further improvement by reacting the deposited and oxidized chromium to form a high molecular weight polymer coating prior to opening the fluidized bed reactor for cleaning. According to prior art methods, the reaction system is cleaned to remove excess chromium deposited on surfaces of the cycle piping, cycle compressor, cycle cooler, and/or distributor plate before the chromium is reacted to form the high molecular weight polymer coating. Without being bound by theory, it is believed that this is required because the method of the prior art circulates a significant amount of the chromium through the reaction cycle, and the high molecular weight polymer coating is difficult to remove once formed. The current invention allows the formation of the high molecular weight polymer coating before the reaction system is cleaned because a significant portion of the chromium is deposited preferentially on the bed section walls, while the polymer coating formed on the reaction system components other than the bed section walls may be reduced. Thus, in one class of embodiments, the chromium is reacted with a monomer, for example, ethylene, to form a high molecular weight polymer coating after the chromium is oxidized and before opening the fluidized bed reactor for cleaning.

In any of the embodiments described herein, the level of oxygen and inert solvent may be reduced by purging the reaction system before the chromium is reacted with the monomer. For example, the fluidized bed reactor may be purged to less than about 1 ppmv oxygen and less than about 100 ppmv of inert solvent before the chromium is reacted with the monomer.

In any of the embodiment described herein, the oxidized chromium may be reacted with a monomer, for example, ethylene, to form the high molecular weight polymer coating. In other embodiments, the chromium may be reacted with the monomer in the presence of a cocatalyst to form the high molecular weight polymer coating. During the reacting step, the reaction system may be first heated to about 80 to 90° C. and the pressure (non-reactive gas at this point) may be established at about 5 BARG after the purging is complete. Next, the monomer may be fed to establish about 4 BARA of monomer partial pressure. In any of the embodiments described herein, there may be greater than about 4 BARA of monomer in the reactor before introducing the cocatalyst to prevent the cocatalyst from reacting with the chromium in the absence of monomer, which it thought to reduce the effectiveness of the chromium polymerization. The cocatalyst, for example, an organometal compound, such as, tri-ethylaluminum (TEAl), may be fed at an even rate over about a 60 minute period. Reactor pressure and monomer partial pressure typically rise during the cocatalyst injection and reacting period due to various system purges routinely fed to the reaction system. In any of the embodiments described herein, the feeding period may be completed without taking a reactor vent. In any of the embodiments described herein, the monomer partial pressure, for example ethylene, may be about 5 to about 20 BARA during the reaction step. In other embodiments, feed flows into the reaction system (monomer and inert purges) are balanced such that 100% of the cocatalyst is charged before the reactor total pressure reaches a maximum allowable level (which may require venting), and before the monomer partial pressure reaches about 10 BARA.

The amount of cocatalyst fed may (optionally, in order of priority): provide sufficient TEAl to activate at least about 75% of the chromium introduced to the fluidized bed reactor; be limited to ensure any liquid cocatalyst film on reactor walls vaporizes by the midpoint (on a time basis) of the reacting step; provide that TEAl starvation will not occur before about 5 to about 15 hours, or about 10 hours, before the end of the reacting step (depends on cocatalyst charge, vent rate, and impurity levels); and provide minimal residual cocatalyst at the end of the reacting step. In any of the embodiments described herein, the cocatalyst may be an organometal compound, such as, TEAl, and the amount of cocatalyst fed may be about 0.5 to about 4.0 kilograms of TEAl per kilogram of chromocene introduced into the fluidized bed reactor. In other embodiments, the cocatalyst may be TEAl, and the amount of cocatalyst fed may be about 1.0 to about 2.0 kilograms of TEAl per kilogram of chromocene introduced into the fluidized bed reactor.

Excessive reactor venting, and the levels of impurities in the reaction system and system feeds, may change the effective cocatalyst/chromium ratio. For a fixed amount of cocatalyst fed, cocatalyst is effectively removed from the system by venting and by reacting with poisons. For example, venting results in a loss of cocatalyst with the vented gas, and thus less active cocatalyst available to react with the deposited chromium. The effective cocatalyst/chromium ratio is lowered by the loss of cocatalyst, and the catalyst activity may drop. Thus, in any of the embodiments described herein, the amount of cocatalyst introduced into the fluidized bed reactor may be adjusted for either high feed impurities and/or high venting rates. For the purposes of this application, a level of impurities of 4 ppmv or higher is considered a high impurity level. A high venting rate will depend on the size of the reaction system. In one embodiment, wherein the reaction system is a 4.9 meter diameter reactor vessel, a venting rate above about 1,500 kgs/hour is a high venting rate.

Another method of determining the cocatalyst feed amount is to fix the level of cocatalyst feed based on experience or after some experimentation. Thus, in any of the embodiments described herein, about 1.7 to about 2.3 kgs of TEAl per kg of active chromocene may charged to the reactor. In other embodiments, all feeds to the reactor comprise less than 2.0 ppm poisons. In still other embodiments, a vent rate of about 10% of the reaction system contained gas mass at about 80 to 90° C. and about 16 to 20 BARG may be established while forming the high molecular weight polymer coating. Furthermore, in any of the embodiments described herein, the amount of TEAl fed may be controlled such that there may be no substantial liquid TEAl present on any reactor surface after about 30 hours of reacting. In other embodiments, substantially all of the cocatalyst, for example TEAl, is depleted after about 50 hours of reacting.

After the cocatalyst feed is complete, the reacting step further comprises a soaking step, wherein the non-reactive gas and the monomer may be circulated for greater than about 40 hours, and may be circulated for greater than about 60 hours. During the soaking step, the chromium continues to react with the monomer in the presence of the cocatalyst to form the high molecular weight polymer coating. During the soaking step, reactor venting to control pressure may be required. Flows into the reaction system and all equipment in the reaction system may be minimized to minimize the required venting and thus the loss of cocatalyst from the fluidized bed reactor. In any of the embodiments described herein, the reaction system may be held at about 80 to 90° C. at a pressure of about 15 to about 25 BARG while the non-reactive gas and monomer are circulated at a CGV of about 0.6 to about 0.70 meters/second.

In any of the embodiments described herein, the soaking step may be followed by deactivating the cocatalyst. The cocatalyst may be deactivated by feeding carbon dioxide ($CO_2$) to the fluidized bed reactor. The $CO_2$ may be fed to achieve a concentration of greater than about 0.5 mol % in the fluidized bed reactor. Furthermore, the $CO_2$ may be circulated for at least about 1 hour.

In other embodiments, the cocatalyst may be hydrolyzed prior to opening the fluidized bed reactor for inspection and cleaning. In any of the embodiments described herein, the fluidized bed reactor may be hydrolyzed by adding water or steam to achieve a concentration of greater than about 300 ppmv, or greater than about 450 ppmv, of water in the fluidized bed reactor and circulating for at least about 1 hour.

After reacting the chromium to form the high molecular weight polymer coating, the fluidized bed reactor may be opened for inspection and cleaning. The cocatalyst may be deactivated as discussed above before opening the reactor and exposing it to the air. While the reactor is open, the injection equipment may be removed, the internals may be inspected and cleaned as required, and measurements may be taken to assure the surfaces of the bed section were properly treated. Measurements that may be taken include charge decay measurements, chromium level measurements, or coating thickness measurements. The bed section walls, expanded section, cycle piping, cycle cooler, and cycle compressor may be inspected and cleaned as required. Rough surfaces may be scrapped or polished to provide a smooth surface. In any of the embodiments described herein, the bed section walls may be polished, for example by hand scraping, to provide a smooth bed section wall. In other embodiments, the distributor plate may be cleaned, for example, by drilling and/or sandblasting, to remove most or substantially all of the chromium and high molecular weight polymer from the surfaces. In other embodiments, the fixed tee-pees removed before introducing the chromium-containing compound may be replaced with new tee-pees or removable deck plate-type flow deflectors during the cleaning step.

In any of the embodiments described herein, a scrub bed may be charged to the fluidized bed reactor, fluidized, and dumped following the cleaning step to remove any sand or other loose material contaminants left in the reactor system during the cleaning step.

After the fluidized bed reactor is cleaned, the reactor may be returned to routine commercial service. A broad range of commercial polymer products may be produced immediately after the treatment process, and with any catalyst family. For example, a product based on a Phillips-type chromium catalyst system, a Ziegler-Natta catalyst system, or a metallocene catalyst system may utilized to produce polymer product immediately after treatment. Prior to the current invention, a reaction system was operated on a chromium or Ziegler-Natta catalyst system for a period of at least about 14 to 21 days before the reaction system could operate successfully on a metallocene catalyst system (due to sheeting problems). For example, the reaction system would be operated on a high melt index Ziegler-Natta based product for about 21 days before a metallocene-based product was produced. In any of the embodiments described herein, a metallocene based polymer product may be produced after forming the high molecular weight polymer coating absent the production of a non-metallocene based polymer product before producing the metallocene based polymer product. In other words, the metallocene catalyst system may be utilized to produce the first polymerization product after post treatment cleaning and scrubbing the reactor with a scrub bed.

Polymerization Processes

Embodiments described herein may be suitable for use in any polymerization process that facilitates the contacting of a catalyst with a monomer or monomer/comonomer. The current invention may be particularly suited for use in gas phase fluid bed polymerization processes. Processes may include gas phase fluid bed polymerization of one or more olefins at least one of which is ethylene (see, for example, U.S. Pat. Nos. 4,543,399, 4,588,790, 5,028,670, 5,317,036, 5,352,749, 5,405,922, 5,436,304, 5,453,471, 5,462,999, 5,616,661 and 5,668,228). Other polymerization processes, particularly gas phase fluid bed processes, may comprise a cycle fluid that comprises a gas phase and a liquid phase.

The process of this invention may be directed toward a gas phase polymerization process of one or more olefin monomers having from 2 to 30 carbon atoms, preferably 2 to 12 carbon atoms, or 2 to 8 carbon atoms. The invention is well suited to the polymerization of two or more olefin monomers of ethylene, propylene, butene-1, pentene-1, 4-methyl-pentene-1, hexene-1, octene-1 and decene-1.

Other monomers useful in the process may include ethylenically unsaturated monomers, diolefins having 4 to 18 carbon atoms, conjugated or nonconjugated dienes, polyenes, vinyl monomers and cyclic olefins. Non-limiting monomers useful in the invention may include norbornene, norbornadiene, isobutylene, isoprene, vinylbenzocyclobutane, styrenes, alkyl substituted styrene, ethylidene norbornene, dicyclopentadiene and cyclopentene.

In one class of embodiments, a copolymer of ethylene may be produced, where with ethylene, a comonomer having at least one alpha-olefin having from 3 to 15 carbon atoms, from 4 to 12 carbon atoms, or from 4 to 8 carbon atoms, may be polymerized in a gas phase process.

The reactor pressure in a gas phase process may vary from about 100 psig (690 kPa) to about 600 psig (4138 kPa), from about 200 psig (1379 kPa) to about 400 psig (2759 kPa), or from about 250 psig (1724 kPa) to about 350 psig (2414 kPa).

The reactor temperature in a gas phase process during the contacting step may vary from about 30° C. to about 120° C., about 60° C. to about 115° C., about 70° C. to 110° C., or about 70° C. to about 95° C.

Other gas phase processes contemplated by the invention may include series or multistage polymerization processes. Also gas phase processes contemplated by the invention may include those described in U.S. Pat. Nos. 5,627,242, 5,665, 818 and 5,677,375, and European publications EP-A-0 794 200 EP-B1-0 649 992, EP-A-0 802 202 and EP-B-634 421.

The invention may also be directed to a polymerization process, for example, a gas phase polymerization process, for polymerizing propylene alone or with one or more other monomers including ethylene, and/or other olefins having from 4 to 12 carbon atoms. Polypropylene polymers may be produced using the particularly bridged metallocene catalysts as described in U.S. Pat. Nos. 5,296,434 and 5,278,264. Propylene based polymers that are produced in the process include atactic polypropylene, isotactic polypropylene, and syndiotactic polypropylene. Other propylene polymers include propylene random, block or impact copolymers.

Catalyst Systems

The catalyst systems utilized for polymerizing a polymer product after treatment according to the current invention may be any suitable catalyst system for polymerizing alpha olefins. In any of the embodiments described herein, the catalyst system may be a bimodal catalyst system. The catalyst compounds which may be utilized in the catalyst system include invention include: Group 15 containing metal compounds; metallocene compounds; phenoxide catalyst compounds; and conventional-type transition metal catalysts. All references to chemical compounds used herein refer to the new IUPAC system of describing the science of chemistry in general as defined in *Nomenclature of Organic Chemistry*, Oxford:Pergamon Press, 1979; *A Guide to IUPAC Nomenclature of Organic Compounds, Recommendations* 1993, Oxford:Blackwell Scientific Publications, 1993 and *Nomenclature of Inorganic Chemistry, Recommendations* 1990, Oxford:Blackwell Scientific Publications (1990). A bimodal catalyst system may comprise the catalyst compositions described in, for example, U.S. Pat. Nos. 6,605,675, 6,846,886, 6,956,089, 6,274,684, 6,841,631, 6,894,128, 6,534,604, and 6,689,847 and PCT publications WO01/30861 and WO02/46243. Catalyst systems may further include a catalyst system comprising a supported bisamide catalyst (see, for example, U.S. Pat. No. 6,271,325).

Metallocene catalyst compounds and catalyst systems useful in the invention may also include those described in, for example, U.S. Pat. Nos. 5,064,802, 5,145,819, 5,149,819, 5,243,001, 5,239,022, 5,276,208, 5,296,434, 5,321,106, 5,329,031, 5,304,614, 5,677,401, 5,723,398, 5,753,578, 5,854,363, 5,856,547 5,858,903, 5,859,158, 5,900,517, 5,939,503 and 5,962,718 and PCT publications WO 93/08221, WO 93/08199, WO 95/07140, WO 98/11144, WO 98/41530, WO 98/41529, WO 98/46650, WO 99/02540 and WO 99/14221 and European publications EP-A-0 578 838, EP-A-0 638 595, EP-B-0 513 380, EP-A1-0 816 372, EP-A2-0 839 834, EP-B1-0 632 819, EP-B1-0 739 361, EP-B1-0 748 821 and EP-B1-0 757 996.

Metallocene catalysts compounds that may be useful in the invention include metallocene compounds described in, for example, WO 92/00333, WO 94/07928, WO 91/04257, WO 94/03506, WO 96/00244, WO 97/15602 and WO 99/20637, and U.S. Pat. Nos. 5,057,475, 5,096,867, 5,055,438, 5,198,401, 5,227,440 and 5,264,405 and EP-A-0 420 436.

Metallocene catalyst compounds may include complexes of $Ni^{2+}$ and $Pd^{2+}$ (see, for example, Johnson et al., "New Pd(II)- and Ni(II)-Based Catalysts for Polymerization of Ethylene and a-Olefins", J. Am. Chem. Soc. 1995, 117, 6414-6415 and Johnson et al., "*Copolymerization of Ethylene and Propylene with Functionalized Vinyl Monomers by Palladium (II) Catalysts*", J. Am. Chem. Soc., 1996, 118, 267-268, WO 96/23010, WO 99/02472, U.S. Pat. Nos. 5,852,145, 5,866,663 and 5,880,241). These complexes may be either dialkyl ether adducts, or alkylated reaction products of the described dihalide complexes that can be activated to a cationic state by the activators of this invention described below.

Also included as metallocene catalyst may be those diimine based ligands of Group 8 to 10 metal compounds (see, for example, PCT publications WO 96/23010 and WO 97/48735 and Gibson et. al., Chem. Comm, pp. 849-850 (1998)).

It is also contemplated that the metallocene catalysts described above may include their structural or optical or enantiomeric isomers (meso and racemic isomers (see, for example, U.S. Pat. No. 5,852,143) and mixtures thereof.

Conventional transition metal catalysts are those traditional Ziegler-Natta catalysts and Phillips-type chromium catalyst. Examples of conventional transition metal catalysts are discussed in U.S. Pat. Nos. 4,115,639, 4,077,904 4,482, 687, 4,564,605, 4,721,763, 4,879,359 and 4,960,741. The conventional transition metal catalyst compounds that may be used in the present invention include transition metal compounds from Groups III to VIII, preferably IVB to VIB of the Periodic Table of Elements.

Still other conventional transition metal catalyst compounds and catalyst systems that may be suitable for use in the present invention are disclosed in U.S. Pat. Nos. 4,124,532, 4,302,565, 4,302,566 and 5,763,723 and published EP-A2 0 416 815 A2 and EP-A10 420 436.

Other catalysts may include cationic catalysts such as $AlCl_3$, vanadium, constrained-geometry catalysts, cobalt, and iron catalysts.

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description of how to make and use the compounds of the invention, and are not intended to limit the scope of that which the inventors regard as their invention.

Example

A gas phase fluidized bed reactor with a conical expanded section was treated. The straight section of the reactor had an inner diameter of about 4.9 meters. The reactor contained approximately 471 square meters of surface area to be treated (walls above the distributor plate, expanded section, and top head). The reaction system was first cleaned by removing excess polymer as described in the specification above. An injection system as shown in FIG. 2 containing ten injection devices (110° V-jet Nozzles model H1/4VV11006 supplied by Spraying Systems Company) was installed in the reaction system. The geometry of the injection system is summarized in Table 1.

TABLE 1

Chromocene Injection System

| | | | Target | Max | Min |
|---|---|---|---|---|---|
| Cr Soln Nozzles | Number | | 10 | — | 8 |
| | Type | | Vjet 110006 | — | — |
| | Injection Pressure | (bar-g) | 2.75 | 3.1 | 2.4 |
| | Separation Between Nozzles | (degrees) | 36 | 34 | 38 |
| | Location from Wall | (cm) | 15 | 20 | 10 |
| | Location From Dist Plate | (m) | 0.5 | 0.6 | 0.4 |
| | Horizontal Orientation | (Angle inward from Tangent) | 47 | 50 | 45 |
| | Vertical Orientation | (Angle upward from Horizontal) | 45 | 50 | 40 |
| Reactor Conditions During Injection | Temp | (C.) | 80 | 85 | 75 |
| | CGV | (m/s) | 0.4 | 0.6 | 0.35 |

The reaction system was pressured up with nitrogen and purged while circulating until the moisture was below 10 ppmv (parts per million by volume) and oxygen was below 1 ppmv. A 5 wt % solution of chromocene in toluene was injected at the conditions shown in Table 1. During the injection, chromocene was fed to ten spray nozzles substantially concurrently. A total of 180 kgs of chromocene solution (9 kgs of active chromocene) was injected in about 15 minutes. The chromocene solution was circulated for about one hour after injection was complete. The reaction system was then oxidized for one hour at 100 ppmv with oxygen supplied from breathing air cylinders. Next the reaction system was purged to less than 1.0 ppmv oxygen and less than about 1.0 ppmv toluene. The reactor pressure and temperature were adjusted to about 5.0 BARG and 85° C. Ethylene was then fed to establish a partial pressure of about 4.0 BARA. Next, 15 kgs of TEAl was fed over a period of about 190 minutes. The ethylene and TEAl circulated for about 60 hours, while incoming flows and venting from the reaction system were minimized. Next, $CO_2$ was fed to establish a concentration of about 0.5 mol % and circulated for about 60 minutes. Then, the reaction system was hydrolyzed at 850 ppmv of water. Next, the reaction system was opened for inspection, and the compressor was cleaned, cycle cooler changed, and distributor plate was sandblasted. The walls of the reactor, and expanded section were smoothed ("polished") by hand scrapping.

The polymer coating was inspected and found to be thick and uniform. Measurements of the thickness of the high molecular weight polymer coating were taken at various points in the reactor. The reactor walls were found to have a high molecular weight polymer coating with an average thickness of about 24 mils (0.61 mm) and a minimum thickness of greater than about 20 mils (0.51 mm). Readings of polymer coating thickness of the reactor walls are shown in Table 2. The readings in all data tables herein are the average of multiple measurements taken at each respective level, excluding measurements taken on manway surfaces.

TABLE 2

| Location Designation | Height above distributor plate (meters) | Avg, Thickness (mils) |
| --- | --- | --- |
| J2 (a) | 0.3 | 29.7 |
| J2 (b) | 1.2 | 20.8 |
| J2 (c) | 2.4 | 34.3 |
| J3 | 3.7 | 26.7 |
| J4 | 6.7 | 25.4 |
| J8 | 9.8 | 24.4 |
| J7 | 12.8 | 27.0 |
| J5 | 15.1 | 26.0 |
| ES | * | 30.9 |
| | Average: | 23.9 |

* Located in the expanded section just above 15.1 meter level

Furthermore, measurements of the thickness of the high molecular weight polymer coating were taken below the distributor plate and on the top and bottom of the distributor plate. The readings are shown in Table 3. The data shows a minimal polymer growth, about 10 mils (0.25 mm), on the distributor plate which indicates the preferential growth of the polymer coating on the bed section walls as opposed to the bottom head or distributor plate.

TABLE 3

| Location Designation | Height below distributor plate (meters) | Avg. Thickness (mils) |
| --- | --- | --- |
| J1 Bottom Head Wall | 1.0 | 19.5 |
| Bottom of Plate | n/a | 11.4 |
| Top of Plate | n/a | 10.9 | n/a = not applicable

Readings of chromium levels on the metal surfaces were taken at various points in the reactor using a Niton XLt 800 Series Alloy Analyzer. The analyzer was set in the "All Alloys Chemistry Testing Mode." The alloy analyzer was placed directly against the metal surface and measurements taken. The chromium (Cr) readings are reported in % Cr reading of the alloy analyzer. The readings for the surface of the bed section wall, shown in Table 4, ranged from 0.3 to 2.85% Cr. The bottom head and distributor plate readings, shown in Table 5, ranged from 0.17 to 0.53% Cr. The bed section wall readings averaged 2.0% Cr, whereas the average reading on the reactor bottom head wall (below the plate) was 0.53% Cr. Comparison of the chromium level on the bottom head wall and on the bed section wall clearly shows that the method preferentially deposits the chromium on the reactor wall as compared to the bottom head. Because the chromium must travel around the cycle piping loop to get to the bottom head, a low reading in the bottom head is evidence that less chromium is circulated in the cycle piping as compared to that contacting the bed section walls. Thus, the method deposits the chromium on the bed section walls as opposed to the cycle piping or other equipment in the gas phase fluidized bed system.

TABLE 4

| Location Designation | Height above distributor plate (meters) | Avg. % Cr Reading |
| --- | --- | --- |
| J2 (a) | 0.3 | 0.30 |
| J2 (b) | 1.2 | 1.15 |
| J2 (c) | 2.4 | 1.65 |
| J3 | 3.7 | 2.03 |
| J4 | 6.7 | 2.55 |
| J8 | 9.8 | 2.65 |
| J7 | 12.8 | 2.85 |
| J5 | 15.1 | 2.7 |
| ES | * | 2.12 |
| | Average: | 2.0 |

* Located in the expanded section just above 15.1 meter level

TABLE 5

| Location Designation | Height below distributor plate (meters) | Avg. % Cr Reading |
| --- | --- | --- |
| J1 | 1.0 | 0.53 |
| Bottom of Plate | n/a | 0.34 |
| Top of Plate | n/a | 0.17 |

The charge decay was measured at various points using a JCI 155 charge decay meter. A corona voltage of 10,000 volts was applied to interior surface of the reactor wall. Residual charge readings (also called charge decay) were taken and are shown in Table 6. These are direct (non normalized) readings. The residual charge readings ranged from 155 to 2075 volts on the bed section walls. The readings in the first 2.4 meters above the plate ranged from 1062 to 2075 volts. The charge decay performance of the bed section wall in the lower section of the reactor is particularly desirable.

TABLE 6

| Designation | Height above Distributor Plate | Residual Charge (volts) |
|---|---|---|
| J2 (a) | 0.3 | 2075 |
| J2 (b) | 1.2 | 1388 |
| J2 (c) | 2.4 | 1062 |
| J3 | 3.7 | 305 |
| J4 | 6.7 | 233 |
| J8 | 9.8 | 225 |
| J7 | 12.8 | 191 |
| J5 | 15.1 | 244 |
| ES | * | 155 |
| | Average: | 226 |

* Located in the expanded section just above 15.1 meter level

Following the post treatment cleaning, a scrub bed was charged, circulated, and dumped. Next a regular seed bed was charged and the reaction system started up on a 3.5 MI, 0.918 density product using a metallocene catalyst system following standard start-up procedures. The reaction system operated without any sheeting problems.

The phrases, unless otherwise specified, "consists essentially of" and "consisting essentially of" do not exclude the presence of other steps, elements, or materials, whether or not, specifically mentioned in this specification, as along as such steps, elements, or materials, do not affect the basic and novel characteristics of the invention, additionally, they do not exclude impurities normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A fluidized bed reactor comprising a plurality of injection devices for introducing a chromium-containing compound into the reactor, said injection devices being located inside the fluidized bed reactor, wherein the injection devices are placed in proximity to a lower section of a bed section wall of the fluidized bed reactor, and the injection devices are oriented to contact a treatment fluid with the bed section wall
wherein the plurality of injection devices are oriented at an angle of 40 to 50 degrees up from a horizontal plane, and the plurality of injection devices are oriented in the horizontal plane at an angle of 40 to 50 degrees inward from the tangent to the bed section wall.

2. The reactor of claim 1, wherein: a chord length between each of the plurality of injection devices is 1.5 to 1.9 meters; the plurality of injection devices are placed 0.15 to 1.0 meters above a distributor plate; the plurality of injection devices are placed 0.10 to 0.50 meters from the bed section wall; and the plurality of injection devices have a spray angle of 100 to 120 degrees.

3. The reactor of claim 1, wherein the plurality of injection devices are placed 0.40 to 0.60 meters above a distributor plate.

4. The reactor of claim 1, wherein the plurality of injection devices are placed 0.10 to 0.20 meters above a distributor plate.

5. The reactor of claim 1, wherein the plurality of injection devices are placed 0.10 to 0.50 meters from the bed section wall.

6. The reactor of claim 1, wherein the injection devices comprise spray nozzles.

7. The reactor of claim 1, wherein the injection devices have a spray angle of about 100 to 120 degrees.

* * * * *